(12) United States Patent
Williams et al.

(10) Patent No.: US 8,528,832 B2
(45) Date of Patent: Sep. 10, 2013

(54) ENGINE COOLING AND CLIMATE CONTROL SYSTEM

(75) Inventors: Alan K. Williams, West Bloomfield, MI (US); Eric F. Bursch, Ypsilanti, MI (US); Edgar A. Vargas-Castañeda, Ann Arbor, MI (US); Don Federico, Grass Lake, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 1070 days.

(21) Appl. No.: 12/471,541

(22) Filed: May 26, 2009

(65) Prior Publication Data

US 2010/0301124 A1 Dec. 2, 2010

(51) Int. Cl.
*B60H 1/12* (2006.01)
*B60H 1/00* (2006.01)
*B60H 1/10* (2006.01)
*F01P 7/14* (2006.01)

(52) U.S. Cl.
USPC ............. 237/2 A; 237/5; 454/69; 454/75; 123/41.08; 165/202

(58) Field of Classification Search
USPC .............. 237/5, 2 A; 123/41.08; 454/75, 454/69; 165/202
See application file for complete search history.

(56) References Cited

U.S. PATENT DOCUMENTS

| | | | |
|---|---|---|---|
| 5,167,129 A * | 12/1992 | Akasaka | 454/75 |
| 5,337,802 A * | 8/1994 | Kajino et al. | 454/75 |
| 5,497,941 A | 3/1996 | Numazawa et al. | |
| 5,678,760 A | 10/1997 | Muso et al. | |
| 5,752,655 A * | 5/1998 | Kodama et al. | 237/12.3 B |
| 6,032,869 A | 3/2000 | Ito et al. | |
| 6,082,626 A | 7/2000 | Morikawa et al. | |
| 6,126,537 A * | 10/2000 | Nagano | 454/139 |
| 6,173,578 B1 * | 1/2001 | Al-Otaibi | 123/41.19 |
| 6,415,856 B1 * | 7/2002 | Gilles | 454/69 |
| 6,772,833 B2 | 8/2004 | Auer et al. | |
| 7,063,138 B2 | 6/2006 | Salim et al. | |
| 7,128,141 B2 | 10/2006 | Ping et al. | |
| 7,287,581 B2 | 10/2007 | Ziehr et al. | |
| 7,370,695 B2 * | 5/2008 | Haglsperger et al. | 454/69 |
| 7,462,099 B2 * | 12/2008 | Wachter | 454/69 |
| 7,735,461 B2 * | 6/2010 | Vetrovec | 123/41.01 |

(Continued)

FOREIGN PATENT DOCUMENTS

| | | | |
|---|---|---|---|
| JP | 02118236 A | * | 5/1990 |
| JP | 06040240 A | * | 2/1994 |

*Primary Examiner* — Kang Hu
*Assistant Examiner* — Phillip E Decker
(74) *Attorney, Agent, or Firm* — Gifford, Krass, Sprinkle, Anderson & Citkowski, P.C.

(57) ABSTRACT

A system that supplements the cooling of the power train of the vehicle and maintains the vehicle's cabin temperature. The system includes an processor, a blower, a heater core, and an evaporator. The blower blows air over the heater core so as to make the heater core in essence an auxiliary radiator. The system further includes a first proportioning valve and a second proportioning valve. The proportioning valves are operable by the processor to control the flow of the dissipated heat between the vehicle cabin and a designated location. Specifically, the first proportioning valve is disposed upstream the heater core and is moveable between an open position and a closed position. The second proportioning valve is disposed downstream the heater core and directs airflow from the heater core between the vehicle cabin and the environment.

8 Claims, 6 Drawing Sheets

(56) References Cited

U.S. PATENT DOCUMENTS

2005/0051320 A1* 3/2005 Tsunoda .................. 165/202
2007/0131407 A1* 6/2007 Natsume .................. 165/202
2007/0218824 A1* 9/2007 Bailey .................... 454/139
2009/0071178 A1* 3/2009 Major et al. .............. 454/75

* cited by examiner

FIG. 6

ENGINE COOLING AND CLIMATE CONTROL SYSTEM

FIELD OF THE INVENTION

The present invention relates generally to a system for dissipating heat from the power train of a vehicle while maintaining temperature control in the vehicle cabin.

DESCRIPTION OF MATERIAL ART

Vehicle engines not only provide power to the power train but also to provide power to auxiliary vehicle functions such as the air conditioning. Furthermore, vehicle operations such as towing, or hill ascent may also increase engine demand. The increase in engine demand also increases the operating temperature of the engine. Prolonged and extreme heat may cause engine parts to wear down thus shortening the life of the engine.

Devices such as a radiator help dissipate engine heat so as to maintain the engine at a predetermined temperature. However, radiators have limited cooling capacity, which is based upon factors such as the physical size of the radiator, the type of coolant used in the radiator, and the like. Though coolant may be changed, the size of the radiator may not necessarily be modified. For instance, the size of the radiator may be restricted due to the packaging of the engine and the styling of the vehicle body.

Thus other systems are currently known and used to help supplement the heat dissipating effects of the radiator. For instance it is known to flow coolant through pipes around the peripheries of the engine to help cool the powertrain. However, implementation of these pipes may not be possible where packaging spaces are tight.

In another known system the vehicle's HVAC system includes a module having a heater core and a secondary blower blowing air onto the heater core. However, the system does not direct the dissipated air into the vehicle cabin for temperature control. Rather, the heated air is directed towards the environment. In such a system, maintaining a desired temperature in the vehicle cabin requires the separate introduction of heated air and cooled air. Thus, two dedicated paths are required to mix dissipated air with cooled air, increasing the vehicle's mass. Yet another disadvantage of introducing two dedicated paths is reconfiguration of the vehicle's HVAC system. Such reconfiguration may present a problem where packaging is tight and thus may ultimately require a modification in styling design.

Accordingly it remains desirable to have a system which supplements the radiator by facilitating the dissipation of heat from the vehicle's power train and also blends dissipated air from the heater core with air cooled by the evaporator so as to maintain a desired temperature in the vehicle cabin.

SUMMARY OF THE PRESENT INVENTION

The present invention provides a system that supplements the cooling of the power train of the vehicle and maintains the vehicle's desired cabin temperature. The system includes an processor which is operable to direct a blower to blow air over the heater core so as to make the heater core in essence an auxiliary radiator. The system further includes a first proportioning valve and a second proportioning valve. The proportioning valves are operable by the processor to control the flow of the dissipated heat between the vehicle cabin and a designated location. The system further includes a powertrain sensor in communication with the powertrain. The powertrain sensor is operable to detect the state of the powertrain to determine if supplemental cooling is required. The processor is also in communication with the powertrain sensor and is further operable to position the first and second proportioning valves to direct air onto the heater core when the power train reaches a predetermined threshold so as to provide supplemental cooling of the powertrain without having to increase the size of the vehicle's radiator.

The system further includes a plenum. The plenum houses the evaporator and the heater core. The evaporator is operable to provide cool air through a first conduit leading into the vehicle cabin. The system further includes a second conduit leading into the environment, and the second proportioning valve is disposed upstream the second conduit so as to selectively direct the flow of dissipated air between the first conduit and the second conduit.

DETAILED DESCRIPTION OF A PREFERRED EMBODIMENT OF THE PRESENT INVENTION

Figure 1:
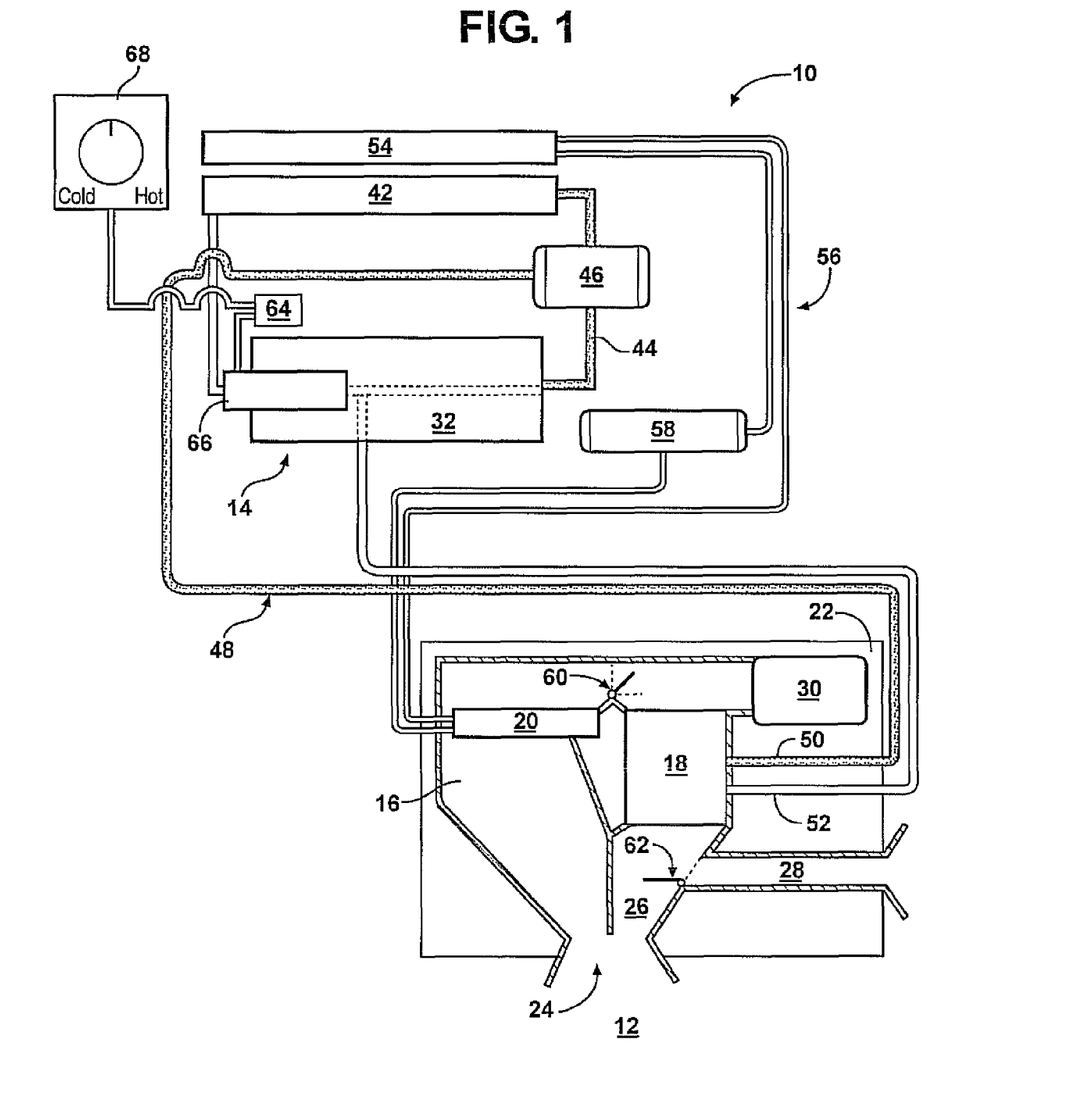
FIG. 1 is a diagram of a system of the present invention.

With reference first to FIG. 1, an illustration of a system 10 for cooling the powertrain 14 of a vehicle and controlling the temperature of the vehicle cabin 12 is provided. The system 10 dissipates heat from the powertrain 14 of a vehicle and may utilize the dissipated heat to help control the temperature of the vehicle cabin 12. The system 10 includes a plenum 16. The plenum 16 houses a heater core 18 and an evaporator 20. The plenum 16 includes an intake 22 and an outtake 24. The outtake 24 provides a path for air to flow into the vehicle cabin 12. The plenum 16 also includes a first conduit 26 and a second conduit 28. The first conduit 26 is located downstream the heater core 18 and is in communication with the outtake 24 so as to deliver air into the vehicle cabin 12. The second conduit 28 defines a path for airflow from the plenum 16 into a designated area such as the environment. The second conduit 28 is also located downstream the heater core 18.

The system 10 also includes a blower 30. The blower 30 is housed in the plenum 16 and is located upstream both the heater core 18 and the evaporator 20. The blower 30 is operable to blow air from the intake 22 onto the evaporator 20 and the heater core 18. The blower 30 may be driven by the engine 32 or a dedicated drive.

The intake 22 may include a fresh air intake 34 and a re-circulated air intake 36. A first baffle 38 and second baffle 40 may be positioned adjacent the fresh air intake 34 and re-circulated air intake 36 respectively. The fresh air intake 34 defines a passage for air from the environment (also referred to by those skilled in the art as ram air) to enter through the blower 30 and into the plenum 16. The re-circulated air intake 36 defines a passage for air from the vehicle cabin 12 to enter through the blower 30 and into the plenum 16. In instances where ram air or re-circulated airflow is strong enough, actuation of the blower 30 may not be necessary.

The engine 32 is in communication with a radiator 42 in a first closed loop circuit 44 wherein engine coolant may be passed through the engine 32 so as to help regulate the temperature of the engine 32. Coolant may be passed through the engine 32 using a pump 46. The radiator 42 is also communication with the heater core 18 in a second closed loop circuit 48. More specifically, a coolant intake 50 interconnects the radiator 42 to the heater core 18, and a coolant outtake 52 interconnects the downstream portion of the heater core 18 to the first closed loop circuit 44. The pump 46 may be operable to circulate coolant through both the engine 32 and the heater core 18.

The system 10 may further include a condenser 54 in communication with the evaporator 20 through a third closed loop circuit 56. A compressor 58 is disposed in the third closed loop circuit 56 between the condenser 54 and evaporator 20 so as to circulate refrigerant through the evaporator 20. The evaporator 20 processes the refrigerant to generate cold air, and the blower 30 may be operable to blow the cold air through the plenum 16 and into the vehicle cabin 12. Any evaporator 20, heater core 18 and blower 30 currently known and used in the art is adaptable for use herein.

The system 10 further includes a first and a second proportioning valve 60, 62. The first proportioning valve 60 is disposed upstream the heater core 18. The first proportioning valve 60 is movable between a closed and an open position. In the closed position, the first proportioning valve 60 blocks the passage of air to the heater core 18. In the open position, the first proportioning valve 60 fully exposes the heater core 18 to airflow. Thus, the amount of airflow directed to the heater core 18 from the blower 30 may be proportioned as the first proportioning valve 60 is moved between the closed and the open position.

The second proportioning valve 62 is disposed downstream the heater core 18. The second proportioning valve is also movable between a closed and an open position. In the closed position, the second proportioning valve 62 blocks the passage of air into the second conduit 28. In the open position, the second proportioning valve blocks the passage of air into the first conduit 26. Thus, airflow from the heater core 18 may be selectively proportioned between the first and second conduits 26, 28.

The system 10 further includes a processor 64. The processor 64 is in communication with the blower 30, the first and second proportioning valve, and the first and second baffles 38, 40 so as to direct the passage of air into the vehicle cabin 12 and the environment. Thus, the processor 64 is operable to independently move the first and second proportioning valves 60, 62 between the open and closed position so as to regulate the airflow from the plenum 16 to either the vehicle cabin 12 or the environment.

The processor 64 is also in communication with a powertrain sensor 66. The powertrain sensor 66 is operable to detect among other things the temperature of the powertrain 14. More specifically, the powertrain sensor 66 is operable to detect the state of the vehicle so as to determine if additional cooling of the powertrain 14 is required. Thus, it is anticipated that the powertrain sensor 66 may be in communication with the radiator 42 so as to determine if the radiator 42 is overheating. In another example, the powertrain sensor 66 is in communication with the engine 32 so as to determine if the engine 32 is overheating. Any sensor currently known and used in the art to detect the state of the powertrain 14 may be used herein, illustratively including a temperature sensor 66.

Figure 2:
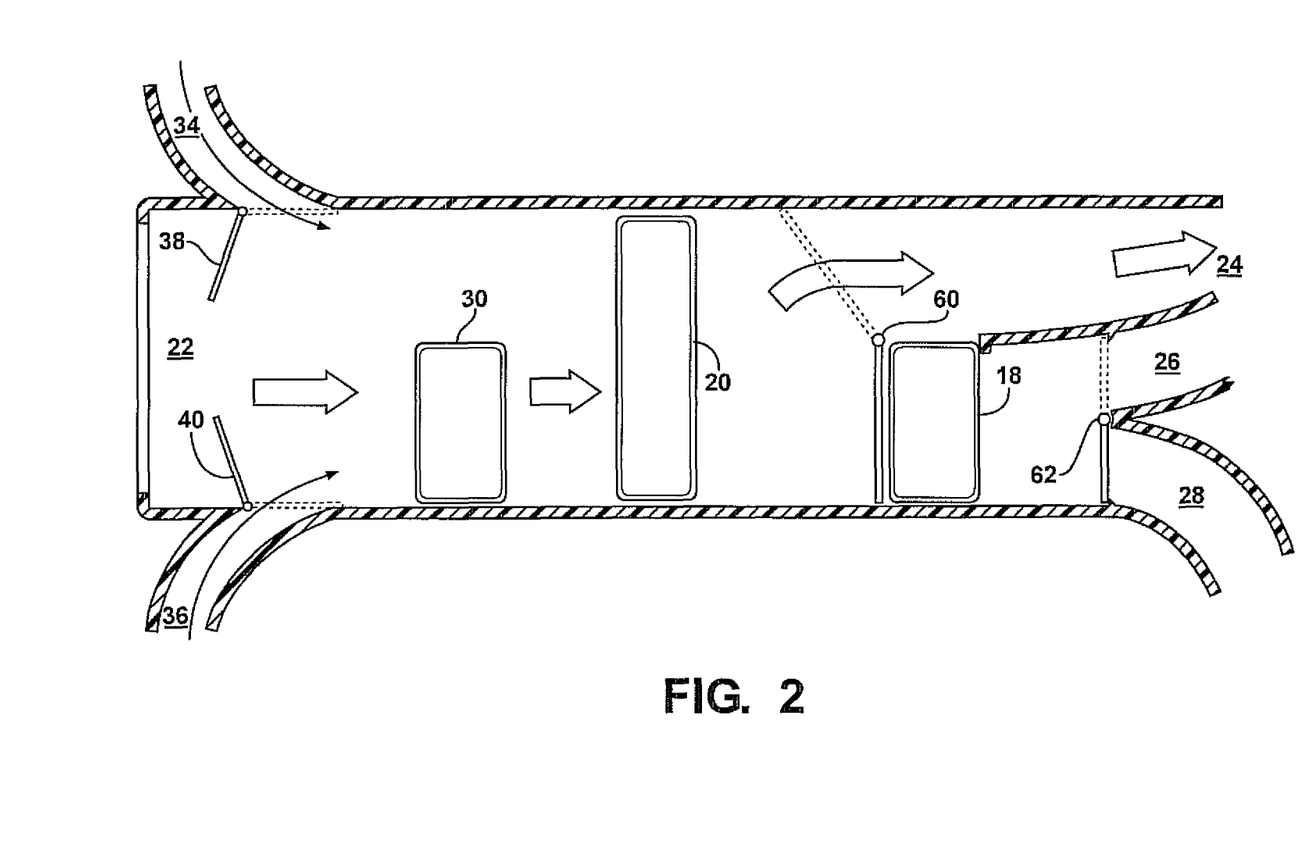
FIG. 2 is a cross-sectional view of the system showing the first and second proportioning valves in the opened and closed positions.

With reference now to FIG. 2, an illustrative diagram of the operation of the system 10 is provided. The powertrain sensor 66 (not shown) detects the state of the vehicle to determine if supplemental cooling of the engine 32 (not shown) is required. The powertrain sensor 66 transmits the state of the powertrain 14 to the processor 64 (not shown) and the processor 64 moves the first and second proportioning valves 60, 62 so as to direct air from the blower 30 to control the temperature of the vehicle cabin 12 and provide supplemental cooling of the powertrain 14. More specifically, the processor 64 moves the first and second proportioning valves 60, 62 between a closed and open position so as to control airflow onto the heater core 18 and into the vehicle cabin 12.

Figure 3:
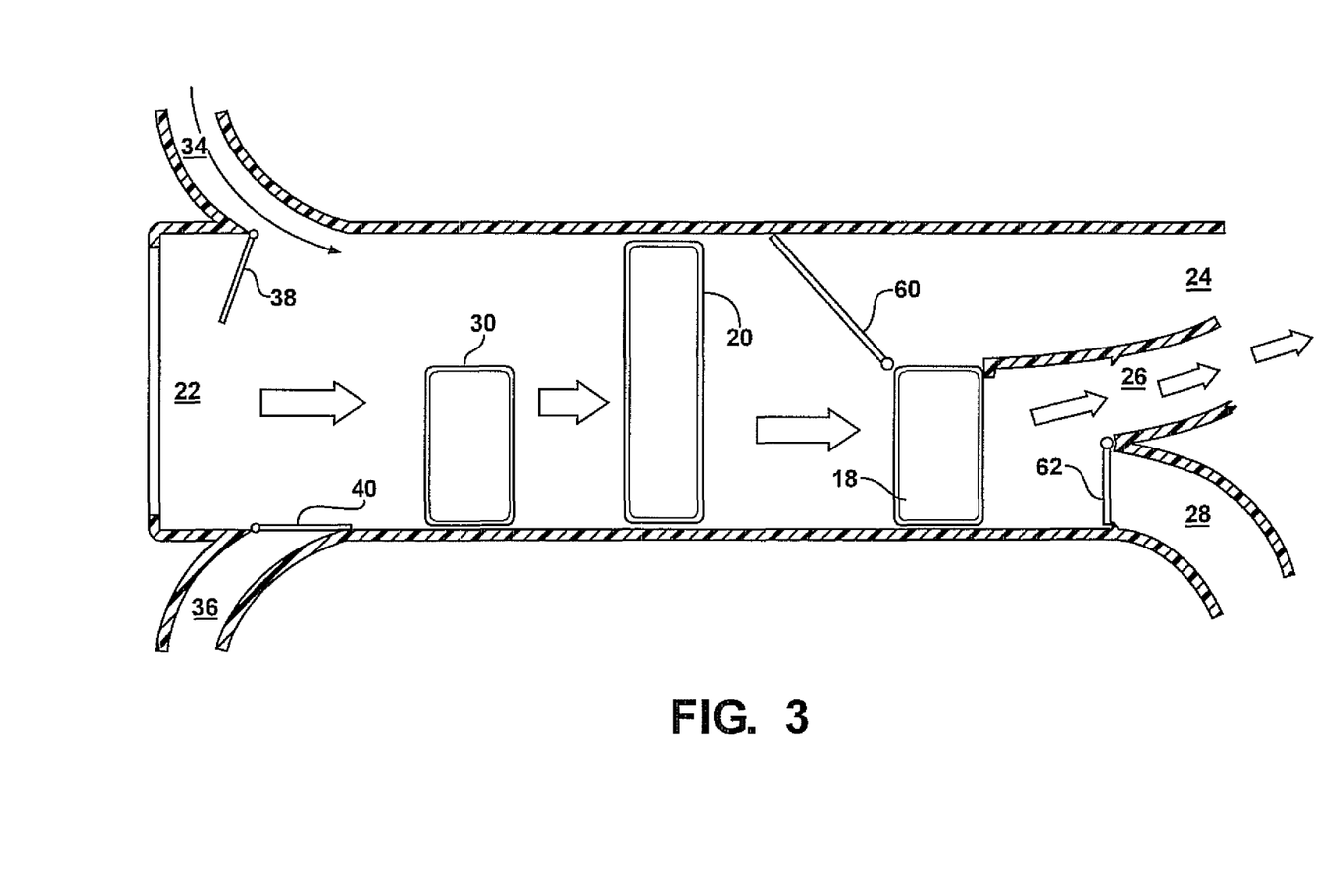
FIG. 3 is a view of FIG. 2 illustrating the position of the first and second proportioning valves when engine cooling and a warn cabin temperature are desired.

The system 10 also receives input from the vehicle's temperature control interface 68, such as a dial or a digital input. In certain conditions, the passengers may desire to maintain warm cabin temperature but the powertrain sensor 66 detects that the engine 32 is overheating. For instance, the vehicle may be operating in a cold environment, while towing and climbing. In such a case, the passenger may manipulate the temperature control interface 68 so as to select a warm temperature for the vehicle cabin 12. The processor 64 may then move the first proportioning valve 60 to the open position.

Where the system 10 includes a ram air sensor, the processor 64 may also open the first baffle 38 so as to allow ram air to pass through the heater core 18. The processor 64 may direct all of the warm air dissipating from the heater core 18 into the vehicle cabin 12 by simple moving the second proportioning valve into the closed position, as illustrated in FIG. 3. Additionally, coolant is supplied to the heater core 18 through coolant intake 50, where the coolant cooled by the blower 30 and returned to the radiator 42 through the coolant outtake 52.

Thus, the heater core 18 supplements the cooling abilities of the radiator 42. As the vehicle cabin 12 temperature exceeds the selected temperature, the processor 64 may move the first proportioning valve 60 closer to the closed position so as to deliver the cold ram air directly into the vehicle cabin 12 and cool the vehicle cabin 12.

Figure 4:
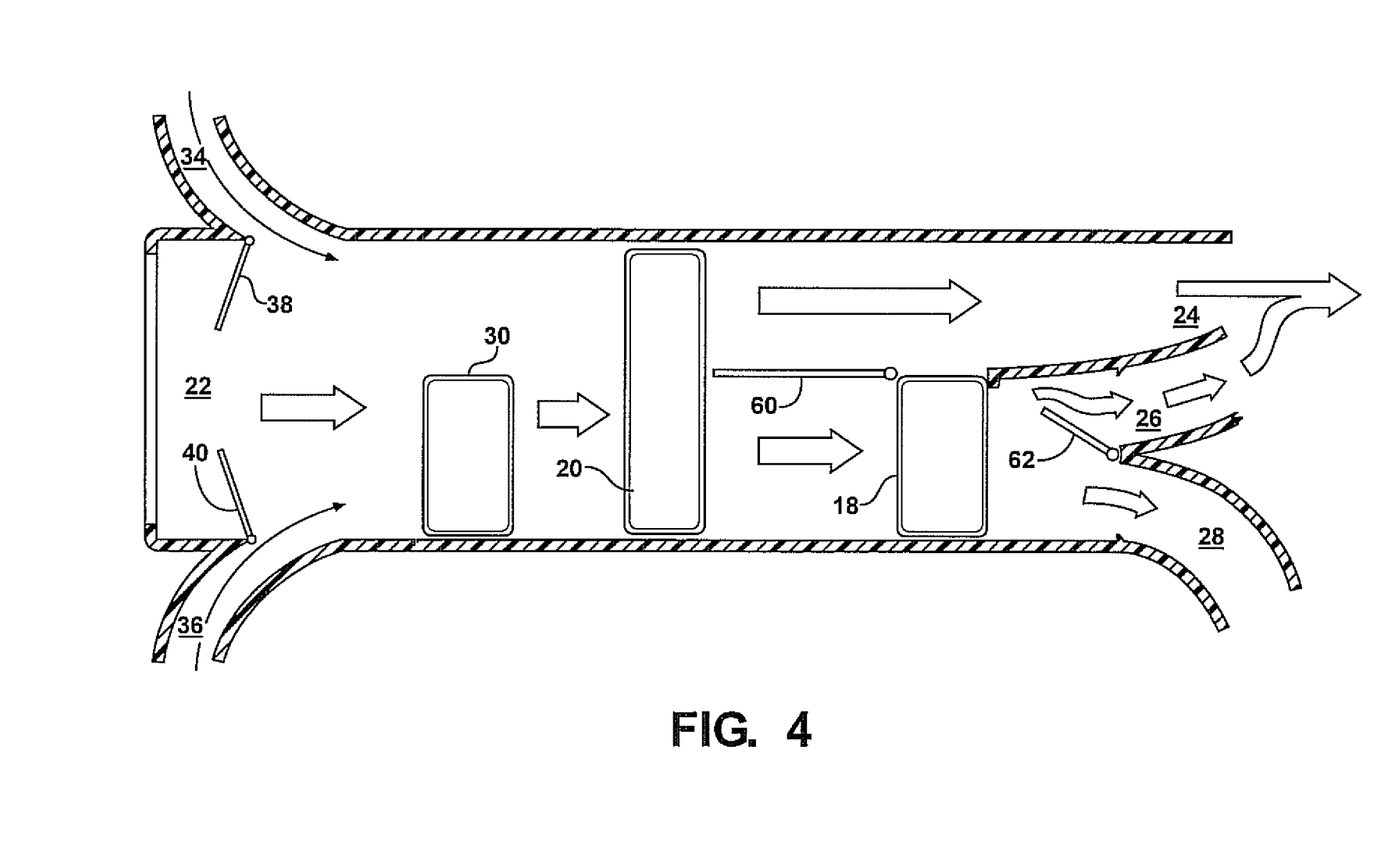
FIG. 4 is a view of FIG. 2 illustrating the position of the first and second proportioning valves to create blended air.

With reference now to FIG. 4, another example of the operation of the system 10 is provided. The vehicle conditions are such that the passengers desire the vehicle cabin 12 to remain cool relative to the environment yet the powertrain sensor 66 detects that the engine 32 is overheating. For instance, the vehicle may be towing during a warm sunny day.

In such a case, the processor 64 moves the first proportioning valve 60 between the open and closed position. Thus a portion of cold air leaving the evaporator 20 is directed onto the heater core 18 by the first proportioning valve 60 so as to cool the engine 32. The remaining cold air is directed directly into the vehicle cabin 12 so as to maintain the vehicle cabin 12 at the selected temperature. Furthermore, the processor 64 moves the second proportioning valve 62 between the closed and open position so as to direct a desired amount of dissipated heat from the heater core 18 into the outtake 24. Thus some of air flowing directly from the evaporator 20 and some of the air flowing from the heater core 18 is blended together in the outtake 24 before entering the vehicle cabin 12. In such an instance, the processor 64 may be further operable to increase the speed of the blower 30 so as to compensate for the air diverted into the environment, thus maintaining a predetermined air pressure within the plenum 16.

Figure 5:
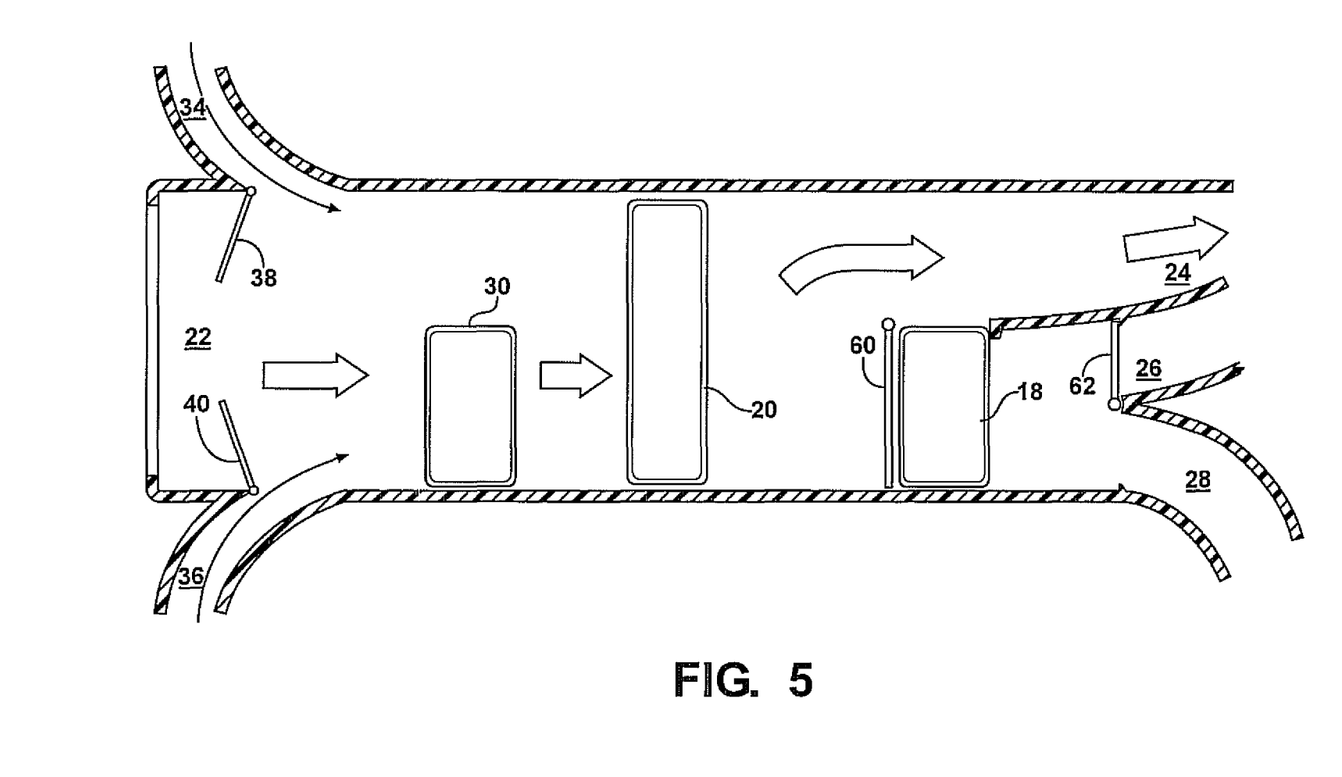
FIG. 5 is a view of FIG. 2 illustrating the position of the first and second proportioning valves when maximum air conditioning is desired.

With reference now to FIG. 5, another example of the operation of the system 10 is provided. In FIG. 5, the vehicle conditions are such that the powertrain sensor 66 detects that the engine 32 is not overheating but the passengers actuate the temperature control interface 68 so as to deliver the coldest temperature setting possible within the vehicle cabin 12. For instance, the vehicle may be operating in extremely hot temperatures and may be descending. In such a case, ram air may be warmer than the selected temperature. Accordingly, the processor 64 moves the first baffle 38 so as to block ram air from entering into the plenum 16. Thus the warm air from the environment does not dilute the cold generated by the evaporator 20. Additionally, the second baffle 40 is moved to an open position so as to provide for unrestricted flow of re-circulated air flowing from the re-circulated air intake 36 into the blower 30.

The processor 64 actuates the blower 30 so as to blow re-circulated air into the plenum 16. Additionally, the processor 64 actuates the evaporator 20 so as to generate cold air and the compressor 58 so as to circulate refrigerant within the third closed loop circuit 56. The processor 64 also moves the first proportioning valve 60 to the closed position so as to completely block air flowing from the evaporator 20 to the heater core 18. Thus cold air leaving the evaporator 20 is directed to the vehicle cabin 12. The second proportioning valve is moved to the closed position wherein heat dissipating from the heater core 18 is blocked from entering the second conduit 28 and directed to the first conduit 26. The above referenced scenarios and cases are provided for illustrative purposes only and should not be read to narrow the appended claims.

With reference now to FIGS. 1 and 5, a first preferred embodiment of the system 10 is provided. The plenum 16 houses the evaporator 20, heater core 18, and blower 30. The intake 22 is configured to supply fresh air and re-circulated air, and the outtake 24 provides a passage for airflow from the plenum 16 into the vehicle cabin 12.

The evaporator 20 is in a side-by-side configuration with the heater core 18. As shown in FIG. 1, the heater core 18, the evaporator 20, and the blower are all aligned along the same axis in side-by-side configuration The first proportioning valve 60 is disposed between the heater core 18 and the evaporator 20 so as to control the air flow onto heater core and the evaporator. The blower 30 is located upstream both the evaporator 20 and the heater core 18. The side-by-side configuration allows both the evaporator 20 and heater core 18 to be actuated simultaneously without affecting the passenger's ability to control the vehicle cabin temperature. Specifically, the processor 64 is operable to control the position of the first and second proportioning valves 60, 62 so as to simultaneously cool the powertrain 14 and blend a desired amount of air for later introduction into the vehicle cabin 12.

The system 10 includes a temperature sensor 66 disposed on the engine 32. The temperature sensor 66 is operable to detect the temperature of the engine 32 and is in communication with the processor 64. The evaporator 20 is supplied with refrigerant from the condenser 54 and the compressor 58 circulates the refrigerant between the condenser 54 and the evaporator 20. The radiator 42 is also in communication with the heater core 18 through the second closed loop circuit 48. The blower 30 may operable to blow air onto the heater core 18 so as to further cool the engine 32, and serve as a supplemental radiator.

The blower 30 is constantly rotating at a predetermined speed and may be powered by the engine 32. The temperature sensor 66 continuously detects and transmits the temperature of the engine 32 to the processor 64. The processor 64 processes the temperature of the engine 32 and the temperature setting of the vehicle so as to move the first and second proportioning valves 60, 62 such that the engine 32 and the vehicle cabin 12 are maintained at a desired temperature.

For instance, when the temperature of the engine 32 reaches a predetermined threshold, the processor 64 positions the first proportioning valve 60 so as to direct a desired amount of the air from the intake 22 onto the heater core 18 so as to increase the dissipation of heat off the heater core 18 and to cool the coolant circulating through the heater core 18 and back into the radiator 42. Accordingly, the heater core 18 acts as an auxiliary radiator, supplementing the cooling abilities of the radiator 42.

The processor 64 is further operable to adjust the position of the second proportioning so as to control the flow of dissipated air between the plenum 16 and the environment. Thus, the system 10 does not control supplemental engine cooling by adjusting the speed of the blower 30. Instead, the system 10 may provide supplemental engine cooling by adjusting the position of the first proportioning valve 60. Furthermore, the system 10 selectively blends air flowing from the evaporator 20 with air flowing from the heater core 18 so as to help maintain a desired vehicle cabin 12 temperature. Additionally, configuring the evaporator 20 and heater core 18 in the side-by-side configuration reduces the packaging space requirements for the system 10. Specifically, having the heater core 18 and the evaporator 20 axially aligned along the width of the vehicle allows the system 10 to be mounted between the engine 32 and the vehicle instrument panel.

Figure 6:
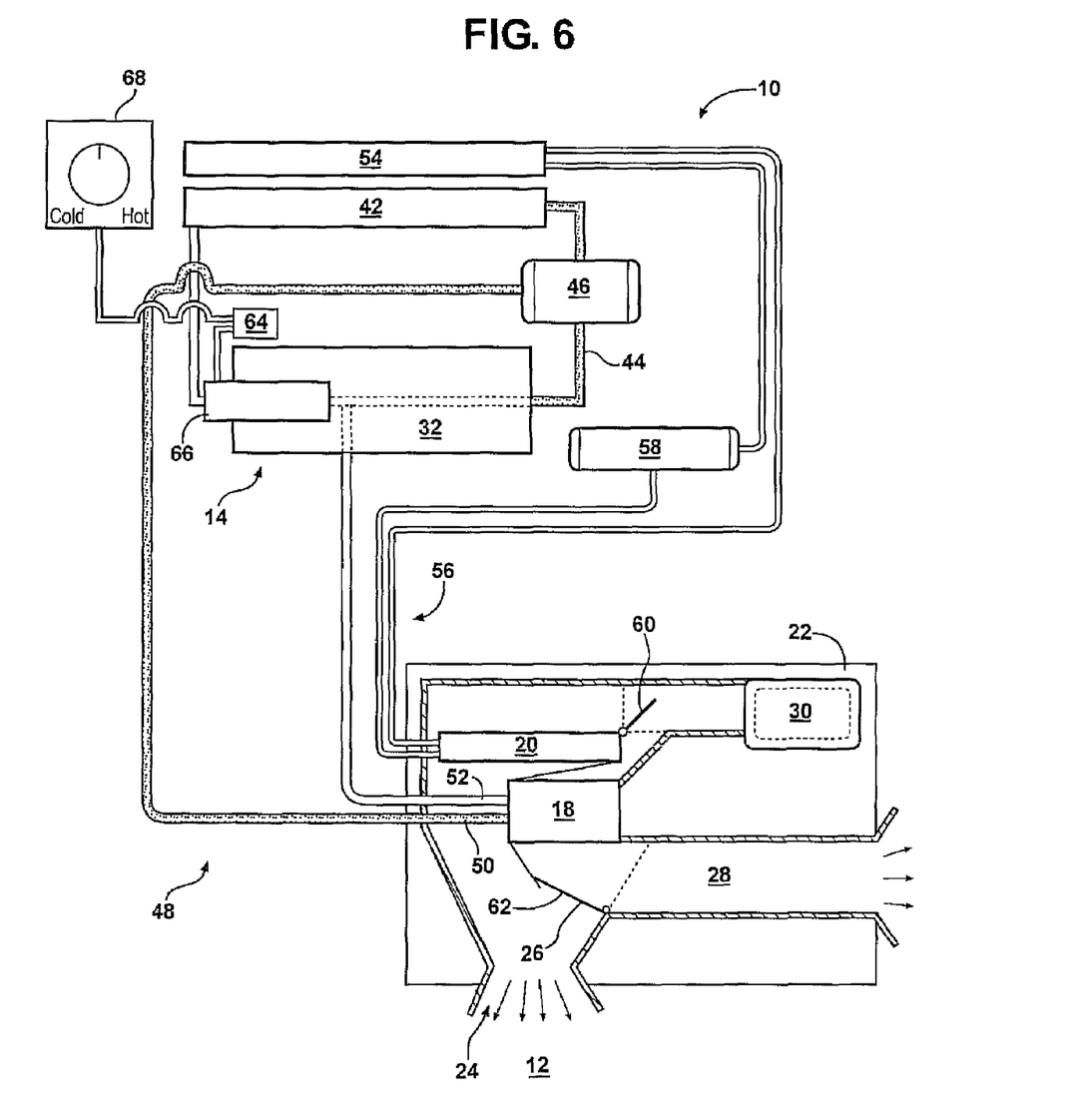
FIG. 6 is a view of diagram of a system having a heater core and an evaporator in a side-by-side configuration.

However, it is also anticipated that the evaporator 20 and the heater core 18 are placed in an up-down configuration, as shown in FIG. 6. As shown in FIG. 6, the evaporator 20 is positioned upstream the heater core 18 along the same axis, and is spaced apart from the blower 30. As with the side-by-side configuration, the processor 64 is operable to position the first and second proportioning valves 60, 62 so as to move the first and second proportioning valves 60, 62 such that the engine 32 and the vehicle cabin 12 are maintained at a desired temperature.

Obviously, many modifications and variations of the present invention are possible in light of the above teachings and may be practiced otherwise than as specifically described while within the scope of the appended claims.

We claim:

1. A system for cooling the powertrain of a vehicle and controlling the temperature of a vehicle cabin, the vehicle having a radiator, and a heater core housed within a plenum, the heater core in a closed loop circuit with the radiator so as to deliver coolant from the heater core to the radiator, a blower operable to blow air onto both an evaporator and the heater core, a powertrain sensor configured to detect the state of the powertrain so as to determine if supplemental cooling of the powertrain is needed, an electronic control unit in communication with the powertrain sensor, the powertrain sensor operable to transmit the state of the powertrain to the electronic control unit, the system operable to supplement the cooling effects of a radiator while maintaining a desired vehicle cabin temperature, the system comprising:

an intake and an outtake fluidly coupled to the plenum, the intake further includes a fresh air intake and a re-circulated air intake;

a first baffle disposed downstream the fresh air intake;

a second baffle disposed downstream the re-circulated air intake, wherein the first and second baffles are independently movable between a closed position wherein the fresh air intake and re-circulated air intake are obstructed, and an open position wherein airflow from the fresh air intake and re-circulated air intake into the plenum is unrestricted;

a first proportioning valve disposed upstream the heater core and downstream the blower, the first proportioning valve operable to move between a closed position wherein the first proportioning valve blocks airflow from the blower onto the heater core, and an open position wherein the first proportioning valve positioned so as to provide unrestricted airflow from the blower to the heater core;

a first conduit and a second conduit, wherein the first conduit provides a passage for air flowing from the heater core to a designated location within the vehicle cabin, and wherein the second conduit provides a passage for air flowing from the heater core to the environment;

a second proportioning valve disposed upstream the first conduit and the second conduit, and downstream the blower, the evaporator, and the intake, wherein the second proportioning valve is movable between first position wherein the second proportioning valve blocks airflow from the heater core to the second conduit, and a second position wherein the second proportioning valve blocks airflow from the heater core to the first conduit; and wherein the electronic control unit is further operable to independently move the first and second proportioning valves so as to control supplemental cooling of the powertrain and the temperature of the vehicle cabin, wherein the second proportioning valve may be positioned so as to direct air from the heater core, through the second conduit to the environment or to the outtake.

2. The system as set forth in claim 1, wherein the heater core is disposed downstream the evaporator.

3. The system as set forth in claim 1, wherein the powertrain sensor is a temperature sensor mounted to the engine of the powertrain.

4. The system as set forth in claim 1, wherein the electronic control unit is operable to adjust the speed of the blower.

5. The system as set forth in claim 1, wherein the electronic control unit is in communication with the first and second baffles so as to move the first and second baffles between the open and closed position.

6. The system as set forth in claim 1, wherein the heater core is in a side-by-side configuration with the evaporator.

7. The system as set forth in claim 1, wherein the heater core is in an up-down configuration with the evaporator.

8. The system as set forth in claim 1, further including a temperature interface operable to selectively choose a desired cabin temperature, the temperature interface transmitting the selected cabin temperature to the electronic control unit, and wherein the electronic control unit is operable to adjust the evaporator, and the heater core and move the first and second proportioning valves so as to maintain the vehicle cabin at the selected cabin temperature.

* * * * *